(12) United States Patent
Nagano

(10) Patent No.: US 7,561,858 B2
(45) Date of Patent: Jul. 14, 2009

(54) WIRELESS COMMUNICATION TERMINAL

(75) Inventor: Hajime Nagano, Sagamihara (JP)

(73) Assignee: Kyocera Corporation, Kyoto (JP)

( * ) Notice: Subject to any disclaimer, the term of this patent is extended or adjusted under 35 U.S.C. 154(b) by 478 days.

(21) Appl. No.: 11/535,883

(22) Filed: Sep. 27, 2006

(65) Prior Publication Data

US 2007/0132607 A1 Jun. 14, 2007

(30) Foreign Application Priority Data

Sep. 28, 2005 (JP) ............................. 2005-281564

(51) Int. Cl.
*H04B 1/04* (2006.01)
(52) U.S. Cl. .............. 455/127.1; 455/67.11; 455/127.2; 455/522
(58) Field of Classification Search ................. 455/126, 455/127.1, 522, 67.11, 503, 403, 90.2, 91, 455/95, 127.2
See application file for complete search history.

(56) References Cited

U.S. PATENT DOCUMENTS 5,574,991 A * 11/1996 Miyama et al. ............. 455/126

5,809,420 A * 9/1998 Ichiyanagi et al. .......... 455/103
6,330,455 B1 * 12/2001 Ichihara .................... 455/522

FOREIGN PATENT DOCUMENTS

| JP | 04-326211 | 11/1992 |
|---|---|---|
| JP | 09-214363 | 8/1997 |
| JP | 2002-271124 | 9/2002 |
| JP | 2003-309473 | 10/2003 |

* cited by examiner

*Primary Examiner*—Tony T Nguyen
(74) *Attorney, Agent, or Firm*—Hogan & Hartson LLP

(57) ABSTRACT

A wireless communication terminal includes a transmission power control unit that changes transmission power; a first storage unit that pre-stores an association of a transmission power value with a difference between a terminal temperature and an ambient temperature; a temperature detection unit that detects a temperature of the terminal to obtain a terminal temperature value; a transmission power detection unit that detects a current transmission power value; a calculation unit that calculates a current ambient temperature value near the terminal; and a temperature estimation unit that estimates a terminal temperature value corresponding to an intended transmission power value based on the current ambient temperature value calculated by the calculation unit, the transmission power value to which the transmission power is changed, and the association of the first storage unit.

6 Claims, 10 Drawing Sheets

FIG. 10

Relative Power Level vs. Data Rate

| Data Rate(kbps) | Data Channel Gain Relative to Pilot(dB) |
|---|---|
| 0 | $-\infty$ (Data Channel is not transmitted) |
| 9.6 | DataOffsetNorm + DataOffset9k6 + 3.75 |
| 19.2 | DataOffsetNorm + DataOffset19k2 + 6.75 |
| 38.4 | DataOffsetNorm + DataOffset38k4 + 9.75 |
| 76.8 | DataOffsetNorm + DataOffset76k8 + 13.25 |
| 153.6 | DataOffsetNorm + DataOffset153k6 + 18.5 |

DataOffsetNorm AND DataOffsetxxkx ARE GIVEN FROM NETWORK

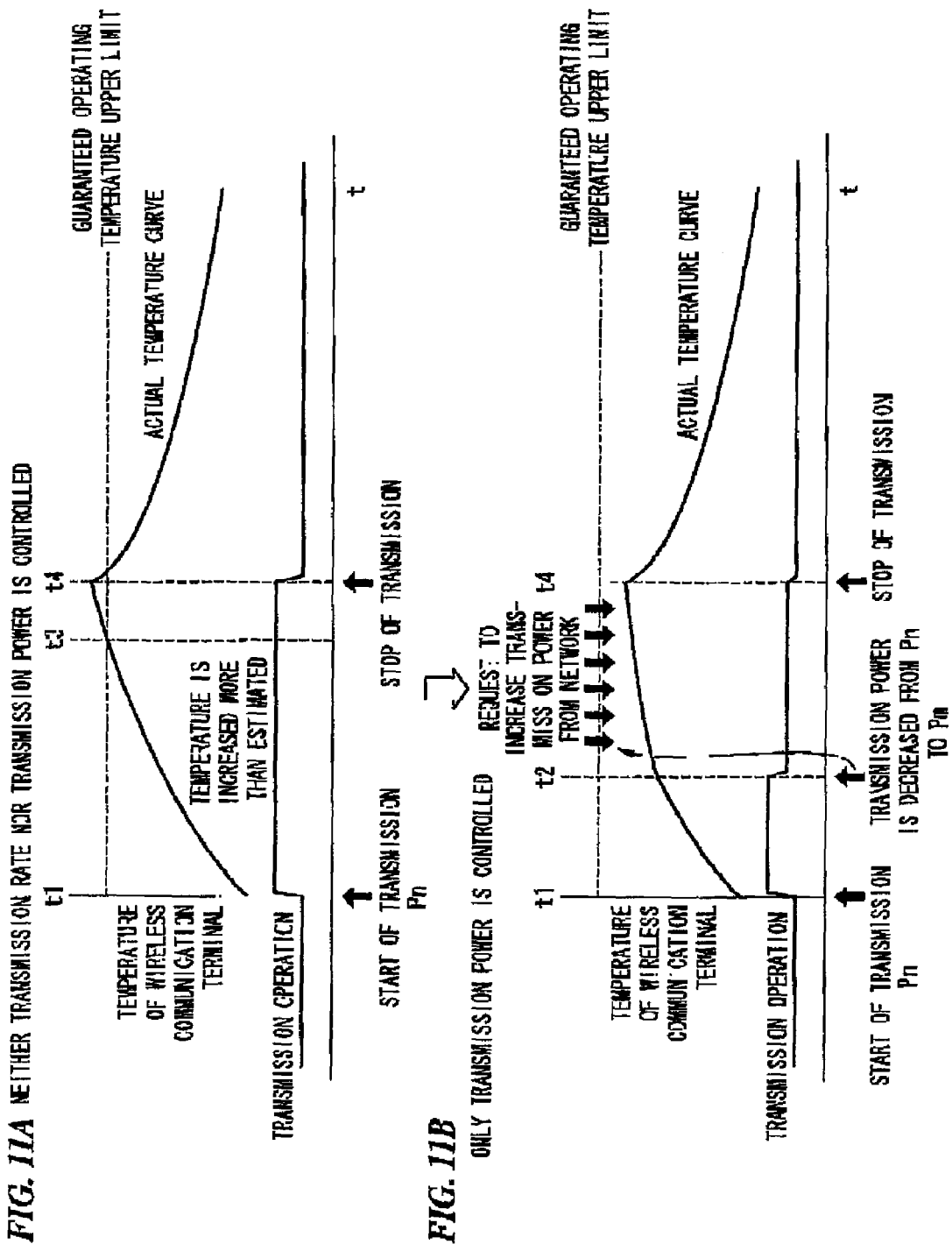

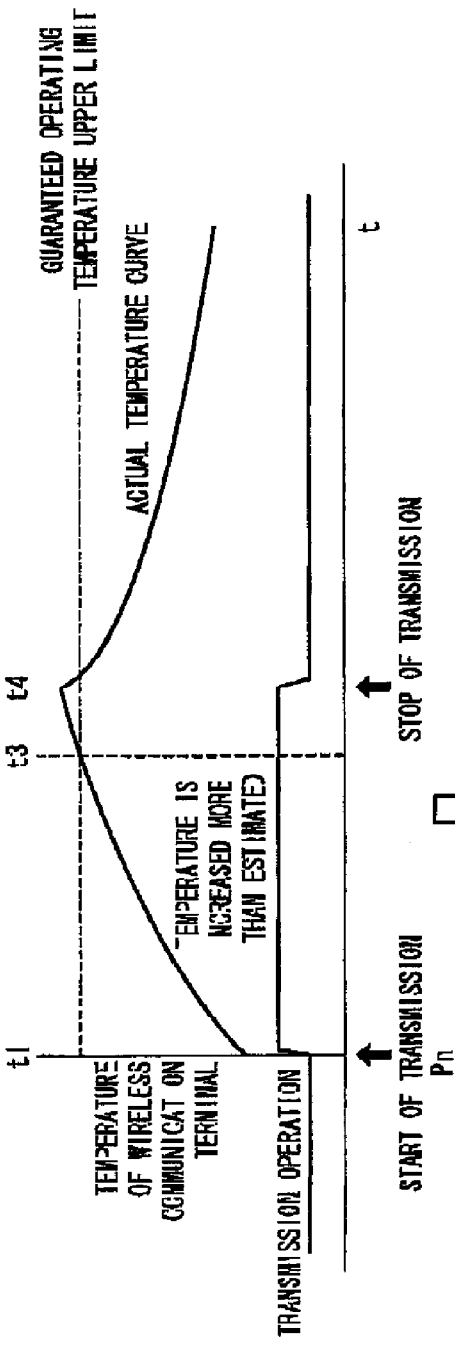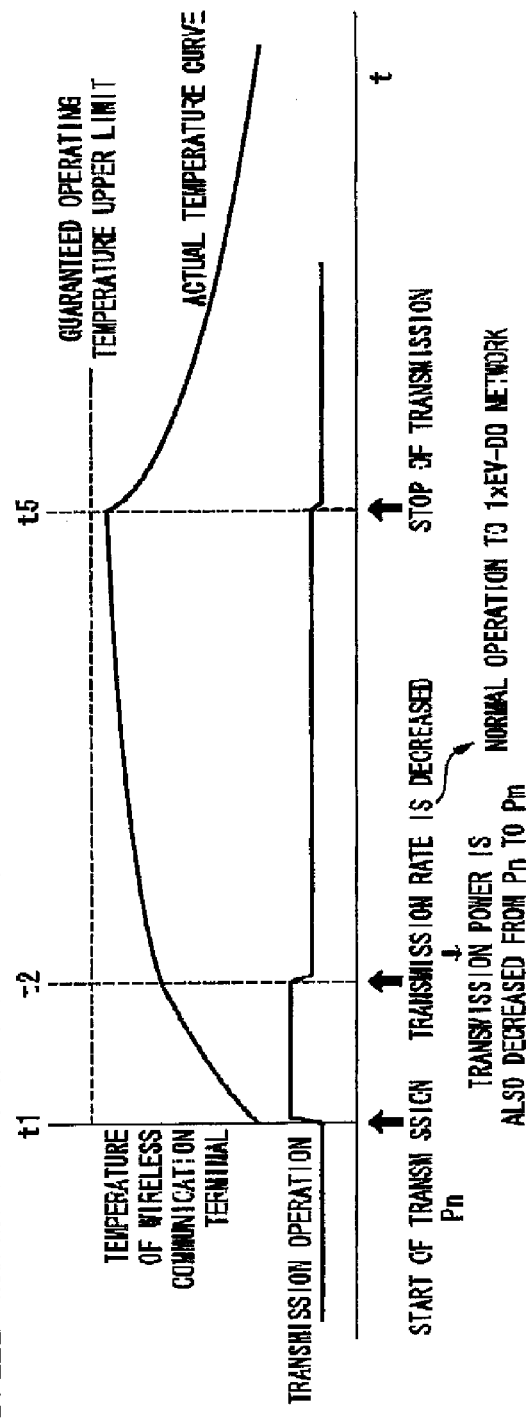

WIRELESS COMMUNICATION TERMINAL

CROSS-REFERENCE TO RELATED APPLICATIONS

Priority is claimed on Japanese Patent Application No. 2005-281564, filed Sep. 28, 2005, the content of which is incorporated herein by reference.

BACKGROUND OF THE INVENTION

1. Field of the Invention

The present invention relates to a wireless communication terminal having a transmission power control function.

2. Description of the Related Art

There is a known technique for suppressing an increase in temperature of wireless communication terminals by decreasing a transmission output when a timer being operated during continuous transmission with normal power reaches a predetermined count value and furthermore by stopping the transmission output when a temperature sensor output exceeds a predetermined value (refer to, for example, Japanese Unexamined Patent Application Publication No. 2003-309473). There is another known technique for decreasing a transmission output when a preset allowable temperature is exceeded and increasing the transmission output to the original level when the temperature falls below the allowable temperature (refer to, for example, Japanese Unexamined Patent Application Publication No. 2002-271124). With still another known technique, when a temperature sensor output exceeds a preset reference value, transmission is restricted within a certain length of time so that the transmission is suspended after the certain length of time has elapsed and is completely disabled when the temperature further increases to exceed another reference value (refer to, for example, Japanese Unexamined Patent Application Publication No. H 04-326211). Furthermore, yet another known technique allows transmission to be suspended or a transmission output to be decreased for a certain period of time when transmission is continued for more than a restricted time frame set according to a transmission output mode (power) (refer to, for example, Japanese Unexamined Patent Application Publication No. H 09-214363).

Wireless communication terminals of PC card type used in card slots of personal computers (PC) generate a large amount of heat from a power amplifying section during transmission. Due to the structure of a wireless communication terminal of card type, heat generated in the manner described above is likely to remain in the card slot of the PC and is difficult to dissipate into the atmosphere outside, thus causing the service life of the wireless communication terminal itself and other devices to shorten. Possible approaches to this problem would be dissipating heat generated by the wireless communication terminal and to prevent the wireless communication terminal form generating extreme heat. Unfortunately, to dissipating generated heat is difficult because the wireless communication terminal of PC card type is mounted in a PC card slot during use. Therefore, the other approach of preventing the wireless communication terminal from generating extreme heat is a noteworthy, feasible solution to the problem.

However, the temperature control method described in, for example, Japanese Unexamined Patent Application Publication No. 2003-309473 is based on a simple control procedure, and is problematic in that there is danger of a guaranteed operating temperature upper limit being exceeded during transmission. Another problem with a wireless communication terminal used in a card slot is that the ambient temperature readily increases due to its structure, and this increased ambient temperature adversely affects the wireless communication terminal itself to cause the temperature thereof to increase.

SUMMARY OF THE INVENTION

The present invention has been conceived in light of these circumstances, and an object thereof is to provide a wireless communication terminal capable of controlling the temperature thereof by controlling transmission power.

According to an aspect of the present invention, a wireless communication terminal includes: a transmission power control unit that changes transmission power; a first storage unit that pre-stores an association of a transmission power value with a difference between a terminal temperature and an ambient temperature; a temperature detection unit that detects a temperature of the terminal to obtain a terminal temperature value; a transmission power detection unit that detects a current transmission power value; a calculation unit that calculates a current ambient temperature value near the terminal; and a temperature estimation unit that estimates a terminal temperature value corresponding to an intended transmission power value based on the current ambient temperature value calculated by the calculation unit, the transmission power value to which the transmission power is changed, and the association of the first storage unit, wherein the transmission power control unit controls the transmission power based on the terminal temperature value estimated by the temperature estimation unit.

In the above-described wireless communication terminal, the calculation unit may calculate the current ambient temperature value based on the terminal temperature value detected by the temperature detection unit, the current transmission power value detected by the transmission power detection unit, and the association of the first storage unit.

In the above-described wireless communication terminal, the transmission power control unit may control the transmission power such that the terminal temperature value estimated by the temperature estimation unit does not exceed a guaranteed operating temperature upper limit of the wireless communication terminal if a transmission power value needs to be changed.

The above-described wireless communication terminal may further include an ambient temperature convergence estimation that estimates an ambient temperature convergence value based on the terminal temperature value obtained by the temperature detection unit, wherein the transmission power control unit obtains a terminal temperature convergence value from the ambient temperature convergence value estimated by the ambient temperature convergence estimation unit by referring to a value indicating the difference between the terminal temperature and the ambient temperature for each transmission power value stored in the first storage unit during a period of time in which there is no increase in transmission power value, and controls the transmission power such that the terminal temperature convergence value does not exceed a guaranteed operating temperature upper limit of the wireless communication terminal.

The above-described wireless communication terminal may further a second storage unit that stores a table containing an association of a transmission rate value with each transmission power value; and a transmission rate control unit that control a transmission rate based on a transmission rate value output from the transmission power control unit, wherein the transmission power control unit refers to the second storage unit to obtain a transmission rate value associated with a transmission power value at which the guaranteed operating temperature upper limit of the wireless communication terminal is not exceeded and outputs the obtained transmission rate value to the transmission rate control unit.

The above-described wireless communication terminal may further include a report unit that reports that transmission is being performed at a transmission power value different from a requested transmission power value, when transmission is performed at a transmission power value different from the requested transmission power value.

According to the present invention, a temperature of the wireless communication terminal as would be measured if the current transmission power were increased is estimated, and if this estimated terminal temperature exceeds the guaranteed operating temperature upper limit, the transmission power is controlled so that the guaranteed operating temperature upper limit is not exceeded. Therefore, the terminal temperature can be prevented from exceeding the guaranteed operating temperature upper limit.

Furthermore, if it is determined that the estimated temperature of the wireless communication terminal obtained from the estimated convergence value of the ambient temperature exceeds the guaranteed operating temperature upper limit, the transmission power is decreased before the guaranteed operating temperature upper limit is actually exceeded. Therefore, the terminal temperature can be prevented from exceeding the guaranteed operating temperature upper limit.

In addition, not only the transmission power but also the transmission rate is decreased. Therefore, the terminal temperature can be prevented from exceeding the guaranteed operating temperature upper limit.

BRIEF DESCRIPTION OF THE DRAWINGS

FIG. 10 illustrates transmission rates associated with transmission power.

FIGS. 11A and 11B are graphs illustrating changes in wireless communication terminal temperature over time.

FIGS. 12A and 12B are graphs illustrating changes in wireless communication terminal temperature over time.

DETAILED DESCRIPTION OF THE INVENTION

A wireless communication terminal according to embodiments of the present invention will now be described with reference to the drawings.

FIRST EMBODIMENT

Figure 1:
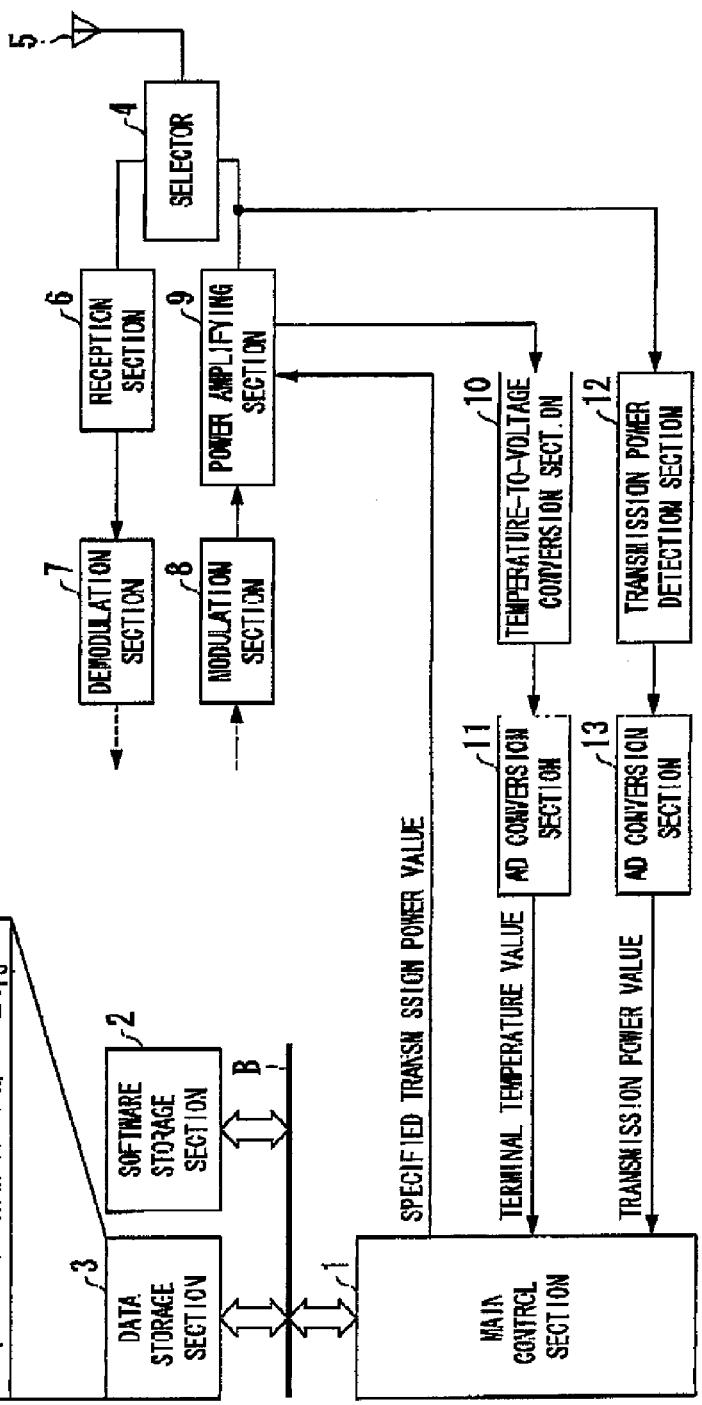
FIG. 1 is a block diagram depicting a preferred structure of a first embodiment.

FIG. 1 is a block diagram depicting a preferred structure of a first embodiment. In this figure, reference numeral 1 denotes a main control section for comprehensively controlling the operation of the wireless communication terminal. Reference numeral 2 denotes a software storage section storing software for operating the wireless communication terminal. Reference numeral 3 denotes a data storage section storing data for controlling the operation of the wireless communication terminal. More specifically, the data storage section 3 stores a $\Delta T$ table 31 containing transmission power values each associated with a value indicating the difference between a terminal temperature and an ambient temperature. The main control section 1, the software storage section 2, and the data storage section 3 are connected to a data bus B. Furthermore, although not shown in FIG. 1, an input section having dial keys etc. arranged thereon and a display section realized by, for example, a liquid crystal display are also connected to the data bus B. Reference numeral 4 denotes a selector for switching between transmission and reception. Reference numeral 5 denotes an antenna. Reference numeral 6 denotes a reception section for receiving a signal of transmitted waves. Reference numeral 7 denotes a demodulation section for demodulating a received signal. Reference numeral 8 denotes a modulation section for modulating a signal to be transmitted. Reference numeral 9 denotes a power amplifying section for amplifying a modulated signal and transmitting the amplified signal. At this time, transmission power is controlled based on a specified transmission power value from the main control section 1. Reference numeral 10 denotes a temperature-to-voltage conversion section for detecting the temperature of the power amplifying section 9 and converting the detected temperature into an electrical signal. Reference numeral 11 denotes an AD conversion section for applying analog-to-digital (AD) conversion to an analog signal (voltage) output from the temperature to voltage conversion section 10 and outputting a signal (terminal temperature value). Reference numeral 12 denotes a transmission power detection section for detecting the power of a signal output from the power amplifying section 9. Reference numeral 13 denotes an AD conversion section for applying AD conversion to an analog signal (power value) output from the transmission power detection section 12 and outputting a digital signal (transmission power value).

The $\Delta T$ table 31 stored in the data storage section 3 will be described below. The $\Delta T$ table 31 contains pre-calculated values $\Delta T$ each associated with a transmission power value, where $\Delta T$ is a value obtained by subtracting the temperature near the wireless communication terminal (hereinafter, referred to as the ambient temperature) from the temperature of the power amplifying section 9 in the wireless communication terminal (hereinafter, referred to as the terminal temperature) when it is performing transmission at a certain transmission power level. For example, if the terminal temperature during transmission at a transmission power value $P_n$ is $T_{Pn}$ and the ambient temperature is $T_a$, then $\Delta T_{Pn}$ is obtained as $\Delta T_{Pn} = T_{Pn} - T_a (>0)$. Therefore, the relationship between each transmission power value and $\Delta T$ at that transmission power value can be obtained by measuring the terminal temperature at each transmission power value $P_n$, more specifically, when $P_n$ is $P_0$ (transmission not being performed) and $P_n$ is changed from $P_{min}$ (minimum transmission power) to $P_{max}$ (maximum transmission power) in a stepwise manner. Each transmission power value is associated with a value $\Delta T$ indicating the difference between the ambient temperature and the terminal temperature measured as described above, and these associates are pre-stored in the data storage section 3 in the form of the $\Delta T$ table 31.

Figure 2:
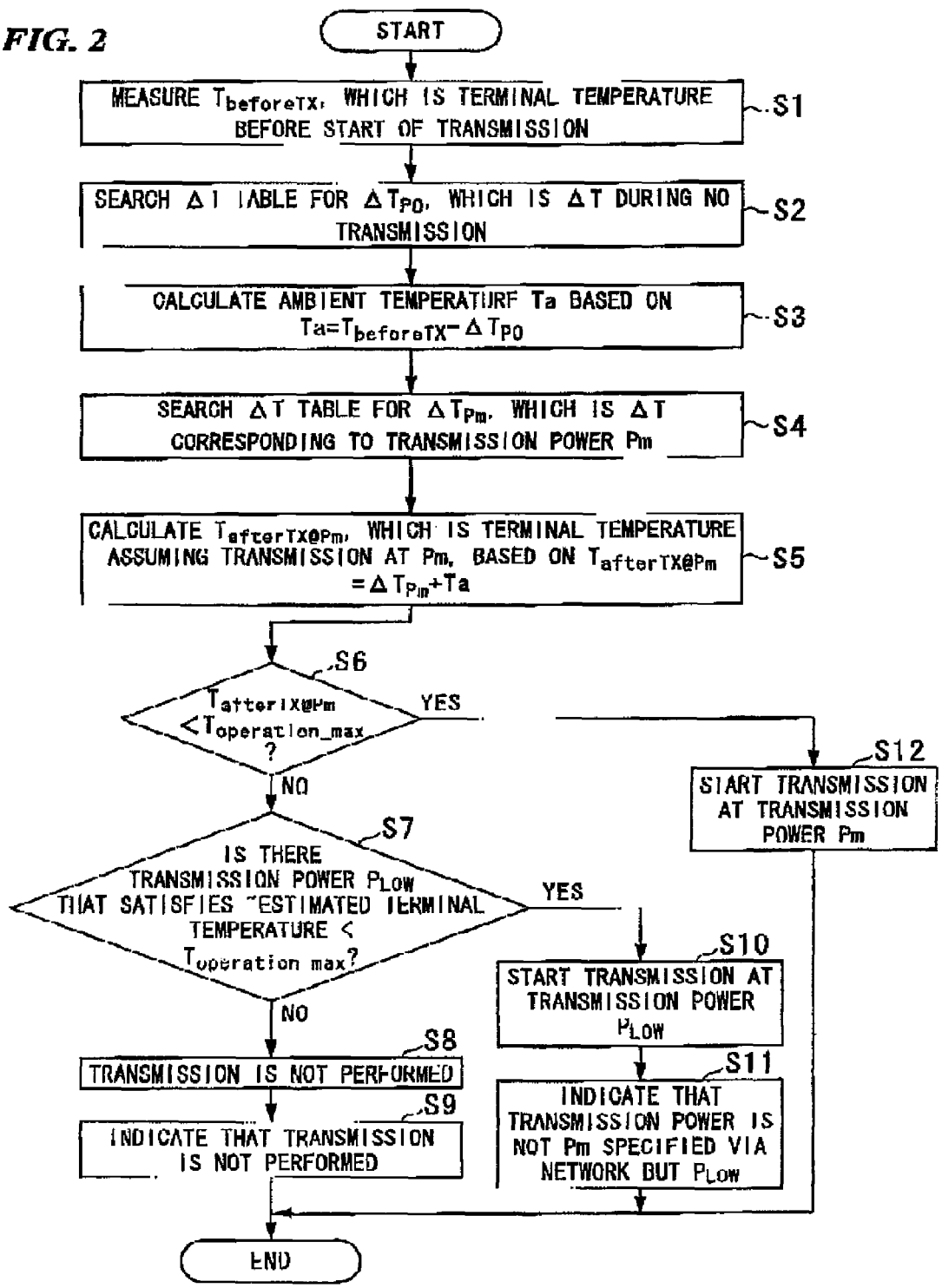
FIG. 2 is a flowchart illustrating the operation of the wireless communication terminal shown in FIG. 1.

The control operation of the wireless communication terminal shown in FIG. 1 will now be described with reference to FIG. 2. First, before the start of transmission, the main control section 1 reads out a terminal temperature $T_{beforeTX}$ measured by the temperature-to-voltage conversion section 10 (step S1) and then reads out from the ΔT table 31 a value $ΔT_{P0}$ indicating ΔT while transmission is not performed (step S2). The main control section 1 calculates an ambient temperature $T_a$ based on the expression "$T_a=T_{beforeTX}-ΔT_{P0}$" (step S3).

Figure 4:
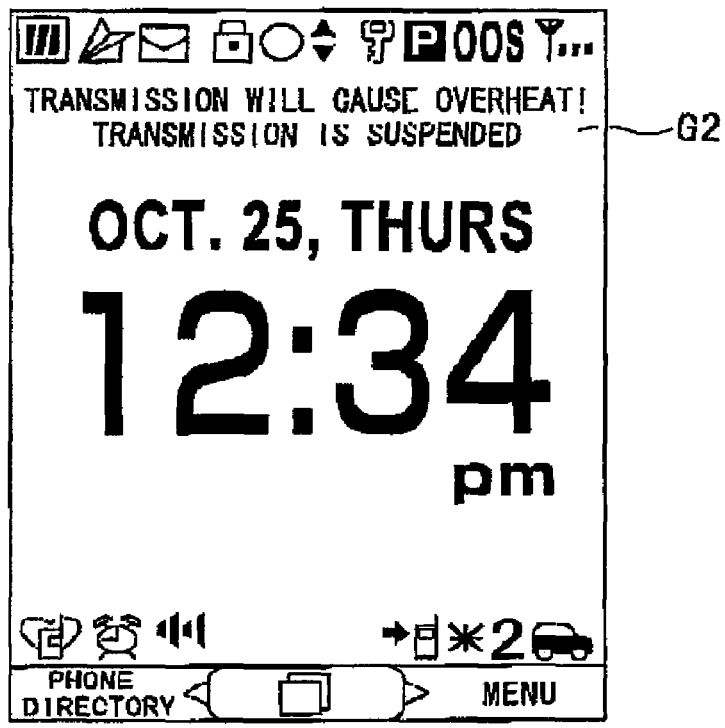
FIG. 4 illustrates an exemplary display message.

Next the main control section 1 reads out from the ΔT table 31 a value $ΔT_{Pm}$ indicating ΔT associated with a transmission power value $P_m$ (a value specified or requested by a base station on the communication network) at which transmission is to be performed (step S4) and calculates an estimated terminal temperature $T_{after\ TX@pm}$ as would be measured if transmission were performed at the transmission power value Pm based on the expression "$T_{afterTX@pm}=ΔT_{Pm}+T_a$" (step S5). Then, the main control section 1 compares the estimated terminal temperature $T_{afterTX@pm}$ with a guaranteed operating temperature upper limit ($T_{operation\_max}$ to determine if the condition "$T_{afterTX@pm}<T_{operation\_max}$" is satisfied (step S6). If the condition "$T_{after\ TX@pm}<T_{operation\ max}$" is not satisfied as a result of this determination, the main control section 1 determines whether there is a transmission power $P_{LOW}$ that satisfies the condition "estimated terminal temperature<guaranteed operating temperature upper limit $T_{operation\_max}$" (step S7). If no transmission power $P_{LOW}$ that satisfies the above-described condition exists, the main control section 1 does not perform transmission (step S8) and displays on the display section a message indicating that transmission is not being performed (step S9). An exemplary message which is displayed on the display section in this case is shown in FIG. 4 (as indicated by reference symbol G2).

Figure 3:
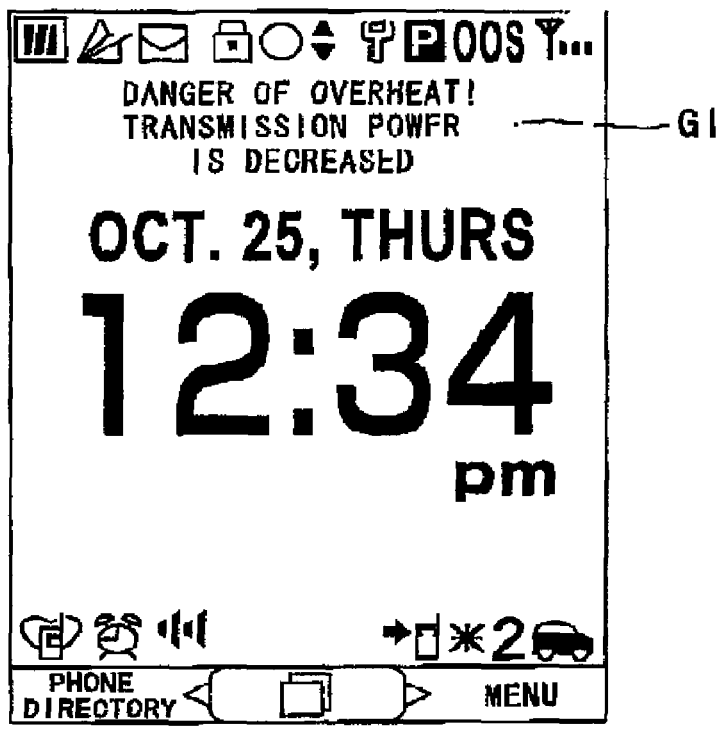
FIG. 3 illustrates an exemplary display message.

On the other hand, if a transmission power $P_{LOW}$ that satisfies the above-described condition exists, the main control section 1 sets $P_{LOW}$ as a specified transmission power value and outputs this specified transmission power value $P_{LOW}$ to the power amplifying section 9 to instruct the power amplifying section 9 to start transmission (step S10). In response, the power amplifying section 9 performs transmission at the transmission power $P_{LOW}$. At this time, the main control section 1 displays on the display section a message indicating that transmission is being performed not at Pm specified via the communication network but at the transmission power $P_{LOW}$, which is lower than Pm (step S11) An exemplary message displayed on the display section in this case is shown in FIG. 3 (as indicated by reference symbol G1).

If the condition "$T_{afterTX@pm}<T_{operation\_max}$" is satisfied as a result of the determination in step S6, the main control section 1 sets Pm as the specified transmission power value and outputs this specified transmission power value Pm to the power amplifying section 9 to instruct the power amplifying section 9 to start transmission (step S12). In response the power amplifying section 9 performs transmission at the transmission power Pm.

In this manner, the temperature of the wireless communication terminal as would be measured if the current transmission power were increased is estimated. By doing so, if the estimate indicates danger of the guaranteed operating temperature upper limit being exceeded, the transmission power is controlled so as not to exceed the guaranteed operating temperature upper limit. Therefore, the terminal temperature can be prevented from exceeding the guaranteed operating temperature upper limit. Furthermore, a message indicating that transmission is being performed at a transmission power value smaller than that specified via the communication network (instead of following the instruction for increasing transmission power sent via the communication network) is displayed. As a result, the user can be informed of the fact that transmission is being performed at a smaller transmission power value.

SECOND EMBODIMENT

Figure 5:
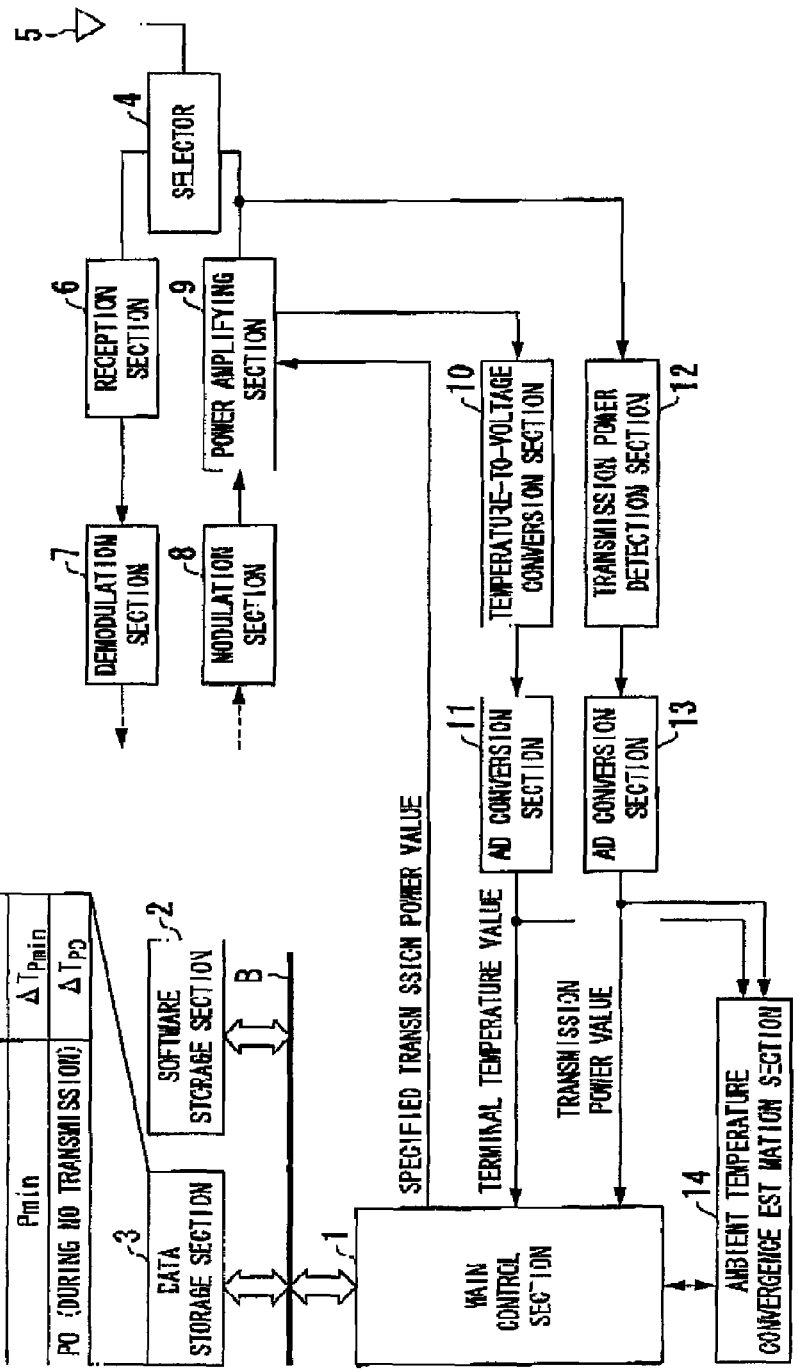
FIG. 5 is a block diagram depicting a preferred structure of a second embodiment.

FIG. 5 is a block diagram depicting a preferred structure of a second embodiment. In FIG. 5, the same components as those of the wireless communication terminal shown in FIG. 1 are denoted by the same reference numerals, and thus a description thereof will be omitted. The wireless communication terminal shown in FIG. 5 differs from the wireless communication terminal shown in FIG. 1 in that the wireless communication terminal in FIG. 5 additionally includes an ambient temperature convergence estimation section 14 (unlike the first embodiment, the wireless communication terminal according to the second embodiment is realized by a PC card type of terminal inserted into a PC card slot for use). When transmission is performed from the power amplifying section 9, heat is generated from the power amplifying section 9, and this heat cannot be dissipated into the outside atmosphere completely, thus possibly causing the ambient temperature of the wireless communication terminal (in the card slot) to increase gradually. For this reason, the ambient temperature value needs to be updated periodically to check a convergence value of this ambient temperature so that it is determined whether the transmission power should be decreased. For this purpose, a convergence value of the ambient temperature needs to be estimated from a change in temperature of the wireless communication terminal. The ambient temperature convergence estimation section 14 inputs a terminal temperature value output from the AD conversion section 11 and a transmission power value output from the AD conversion section 13 to estimate a convergence value of the ambient temperature and outputs the estimated convergence value of the ambient temperature to the main control section 1.

Figure 6:
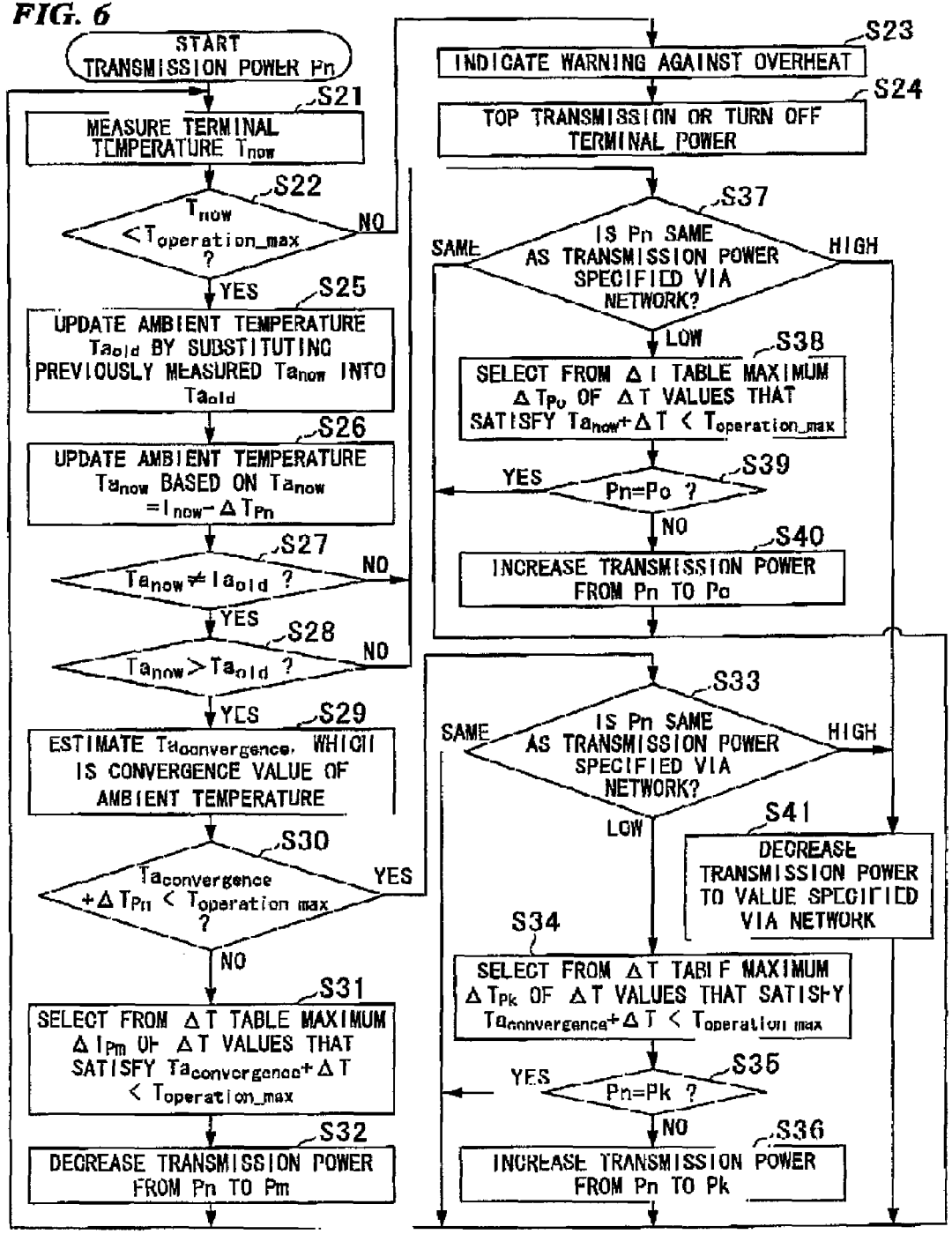
FIG. 6 is a flowchart illustrating the operation of the wireless communication terminal shown in FIG. 5.

The control operation of the wireless communication terminal shown in FIG. 5 will be described with reference to FIG. 6. The following description assumes that the power value currently transmitted from the power amplifying section 9 is Pn. First, the main control section 1 reads out the current terminal temperature $T_{now}$ measured by the temperature-to voltage conversion section 10 (step S21) and compares the terminal temperature $T_{now}$ with the guaranteed operating temperature upper limit $T_{operation\_max}$ to determine whether the condition "$T_{now}<T_{operation\_max}$" is satisfied (step S22). if the condition "$T_{now}<T_{operation\_max}$" is not satisfied as a result of this determination, the main control section 1 displays a warning message indicating an overheat state on the display section (step S23) and stops transmission or turns OFF the power of the wireless communication terminal (step S24).

Figure 7:
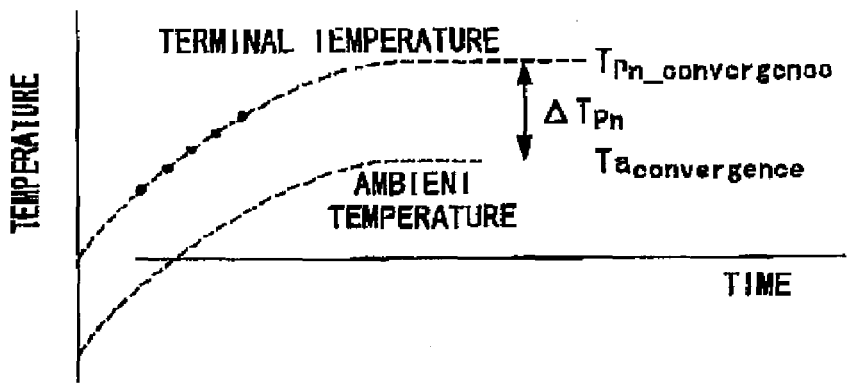
FIG. 7 is a graph illustrating changes in wireless communication terminal temperature and ambient temperature over time.

On the other hand, if the condition "$T_{now}<T_{operation\_max}$" is satisfied, the main control section 1 substitutes the previously measured $Ta_{now}$ into $Ta_{old}$ to update the ambient temperature value (step S25) and also updates the ambient temperature $Ta_{now}$ by the calculation based on $Ta_{now}=T_{now}-ΔT_{Pn}$ (step S26: $ΔT_{Pn}$ is read out from the ΔT table 31 in this case). Thereafter, the main control section 1 compares $Ta_{now}$ with $Ta_{old}$ to determine whether the condition "$Ta_{now}≠Ta_{old}$" is satisfied (step S27). If the condition "$Ta_{now}≠Ta_{old}$" is satisfied as a result of this determination, it is further determined whether the condition "$Ta_{now}>Ta_{old}$" is satisfied (step S28). If the condition "$Ta_{now}>Ta_{old}$" is satisfied as a result of this determination, it indicates that the ambient temperature is increasing, and accordingly, the main control section 1 estimates $Ta_{convergence}$, which is a convergence value of the ambient temperature (step S29). As shown in FIG. 7, since the ambient temperature converges to a predetermined temperature due to heat dissipation or cooling state at the terminal casing, the terminal temperature measured at the transmission power value Pn also converges to $T_{Pn\_convergence}$. A convergence value of the terminal temperature ($T_{Pn\_convergence}$) is obtained by adding $\Delta T_{Pn}$ to $Ta_{convergence}$, which is the convergence value of the ambient temperature. The convergence value of this terminal temperature ($T_{Pn\_convergence}$) is nothing but an estimate because $Ta_{convergence}$, which is the convergence value of the ambient temperature, is an estimated value.

The main control section 1 compares the convergence value of the terminal temperature ($T_{Pa\_convergence}=Ta_{convergence}+\Delta T_{Pn}$) with the guaranteed operating temperature upper limit $T_{operation\ max}$ to determine whether the condition "$Ta_{convergence}+\Delta T_{Pn}<T_{operation\_max}$" is satisfied (step S30). If the condition "$Ta_{convergence}+\Delta T_{Pn}<T_{operation\_max}$" is not satisfied as a result of this determination, the main control section 1 selects from the $\Delta T$ table 31 the maximum $\Delta T_{Pm}$ of all $\Delta T$ values that satisfy the condition "$Ta_{convergence}+\Delta T<T_{operation\_max}$" (step S31). Then, the main control section 1 decreases the transmission power value from Pn to Pm and outputs this transmission power value Pm to the power amplifying section 9 as a specified transmission power value (step S32). In response, the power amplifying section 9 performs transmission at the transmission power Pm. At this time, the main control section 1 displays on the display section a message indicating that the transmission power is not Pn specified via the communication network and transmission is being performed at a transmission power value smaller than Pn.

Figure 8:
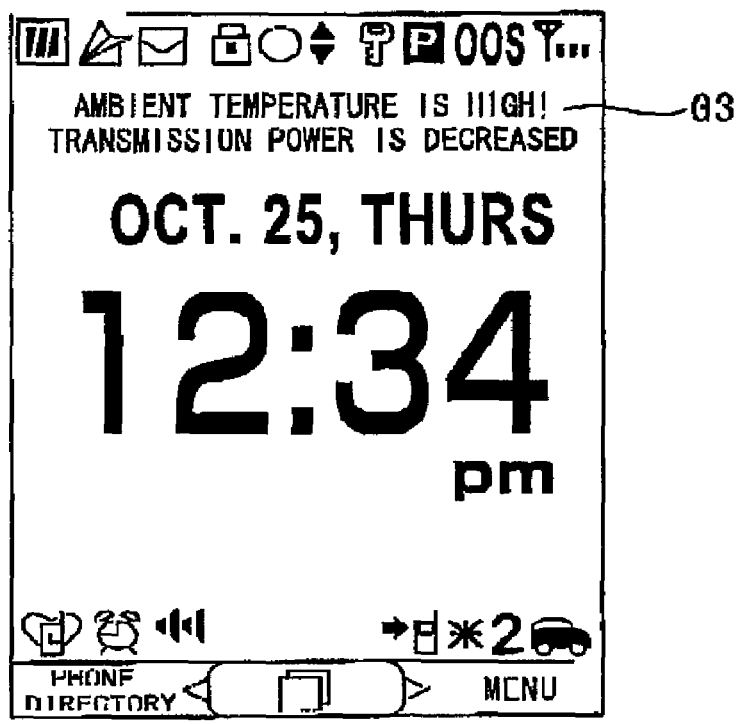
FIG. 8 illustrates an exemplary display message.

An exemplary message to be displayed on the display section in this case is shown in FIG. 8 (as indicated by reference symbol G3). It is noted that although the message shown in FIG. 8 is displayed on the display section as in the first embodiment, the display section in this embodiment corresponds to the display screen of the PC since this embodiment assumes a wireless communication terminal of PC card type is used.

On the other hand, if the condition "$Ta_{convergence}+\Delta T_{Pn}<T_{operation\_max}$" is satisfied as a result of the determination in step S30, the main control section 1 determines whether the current transmission power value Pn is the same as the transmission power specified by the base station on the communication network (step S33). If the value Pn is the same as the transmission power specified by the base station as a result of this determination, the flow returns to step S1 with the current state maintained. If the transmission power value Pn is smaller than the specified transmission power value, the main control section 1 selects from the $\Delta T$ table 31 the maximum $\Delta T_{PK}$ of all $\Delta T$ values satisfying the condition "$Ta_{convergence}+\Delta T<T_{operation\_max}$" (step S34) and determines whether the condition "Pn=Pk" is satisfied (step S35). If the condition "Pn=Pk" is satisfied, the flow returns to step S1 with the current state maintained. If the condition in step S35 is not satisfied, the main control section 1 increases the transmission power value form Pn to Pk and outputs this transmission power value Pk to the power amplifying section 9 as a specified transmission power value (step S36). As a result, the power amplifying section 9 performs transmission at the transmission power Pk. If the transmission power value Pn is larger than the specified transmission power value in step S33, the main control section 1 decreases the transmission power to the transmission power value specified by the base station on the communication network and outputs it to the power amplifying section 9 (step S41).

Referring back to steps S27 and S28, if the condition "$Ta_{now} \neq Ta_{old}$" is not satisfied in step S27 or if the condition "$Ta_{now}>Ta_{old}$" is not satisfied in step S28, the main control section 1 determines whether the current transmission power value Pn is the same as the transmission power specified by the base station on the communication network (step S37). If Pn is the same as the transmission power specified by the base station as a result of this determination, the flow proceeds to step S1 with the current state maintained. If the transmission power value Pn is smaller than the specified transmission power value in step S37, the main control section 1 selects from the $\Delta T$ table 31 the maximum $\Delta T_{Po}$ of all $\Delta T$ values satisfying the condition "$Ta_{now}+\Delta T<T_{operation\_max}$" (step S38) and determines whether the condition "Pn=Po" is satisfied (step S39). If the condition "Pn=Po" is satisfied, the flow returns to step S1 with the current state maintained. If the condition in step S39 is not satisfied, the main control section 1 increases the transmission power value from Pn to Po and outputs this transmission power value Po to the power amplifying section 9 as a specified transmission power value (step S40) As a result, the power amplifying section 9 performs transmission at the transmission power Po. If the transmission power value Pn is larger than the specified transmission power value in step S37, the main control section 1 decreases the transmission power to the transmission power value specified by the base station on the communication network and outputs it to the power amplifying section 9 (step S41).

As described above, if it is determined that an estimated temperature of the wireless communication terminal obtained from an estimated convergence value of the ambient temperature exceeds the guaranteed operating temperature upper limit, the transmission power is decreased before the guaranteed operating temperature upper limit is actually exceeded. Thus, the terminal temperature is prevented from exceeding the guaranteed operating temperature upper limit. Furthermore, a message indicating that transmission is being performed at a transmission power value smaller than that specified via the communication network (instead of following the instruction for increasing transmission power sent via the communication network) is displayed. As a result, the user can be informed of the fact that transmission is being performed at a smaller transmission power value.

THIRD EMBODIMENT

Figure 9:
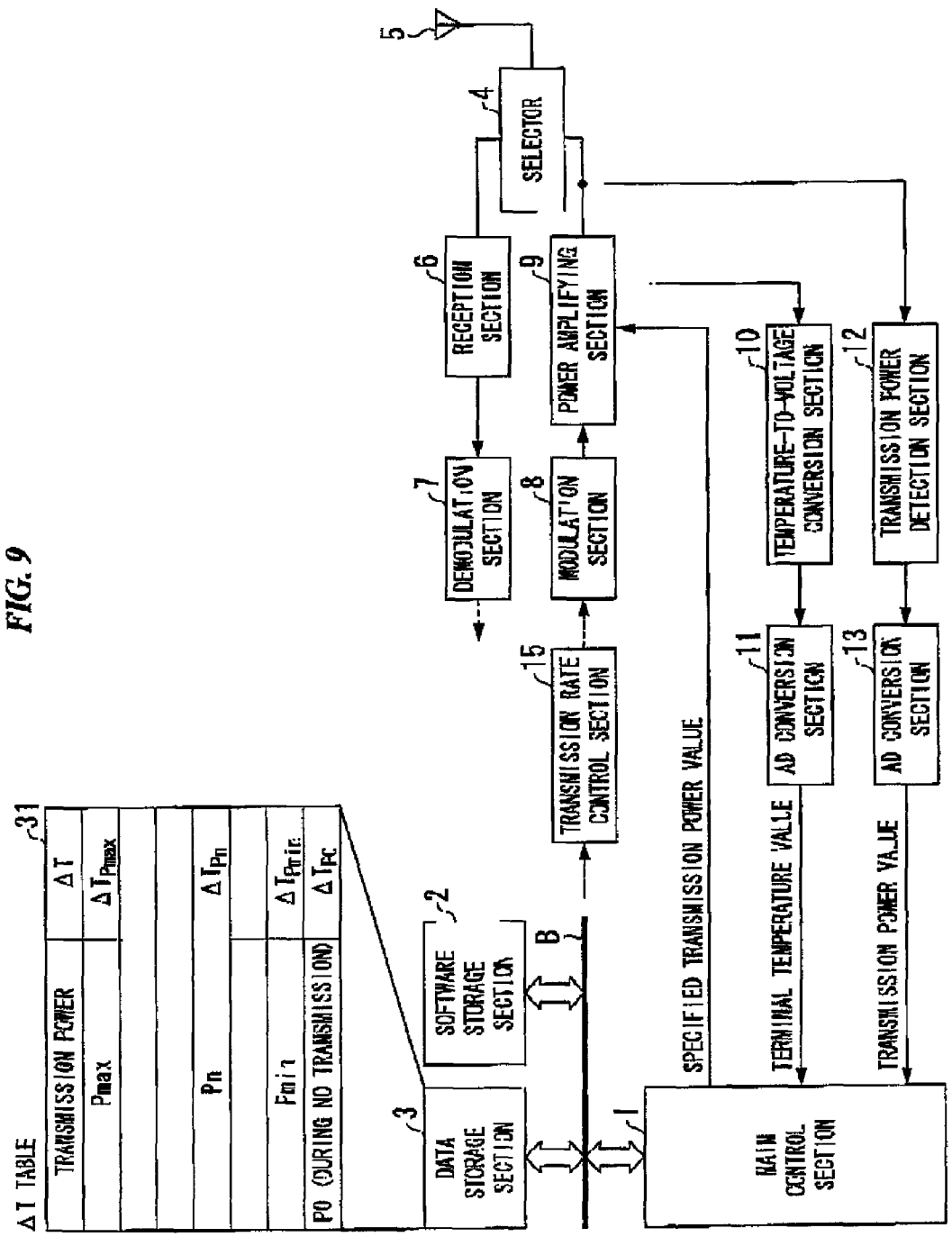
FIG. 9 is a block diagram depicting a preferred structure of a third embodiment.

FIG. 9 is a block diagram depicting a preferred structure of a third embodiment. In FIG. 9, the same components as those of the wireless communication terminal shown in FIG. 1 are denoted by the same reference numerals, and thus a description thereof will be omitted. The wireless communication terminal shown in FIG. 9 differs from the wireless communication terminal shown in FIG. 1 in the following three points. The wireless communication terminal shown in FIG. 9 operates based on 1xEV-DO standard, additionally includes a transmission rate control section 15 for changing a transmission rate based on a transmission rate control signal output from the main control section 1, and stores in the data storage section 3 a table containing transmission rates associated with transmission power as shown in FIG. 10. When the control of decreasing transmission power is to be performed according to the procedure shown in FIG. 2 or FIG. 6 (step S10 shown in FIG. 2 or steps S31 and S32 shown in FIG. 6), the main control section 1 instructs the transmission rate control section 15 to decrease the transmission power and also outputs a transmission rate control signal for decreasing the transmission rate based on 1xEV-DO standard. A transmission rate is selected by obtaining a transmission power value P below the guaranteed operating temperature upper limit according to the procedure shown in FIG. 2 or FIG. 6 and then searching the table containing transmission rates associated with transmission power shown in FIG. 10 for the transmission rate corresponding to the obtained transmission power P.

Transmission operation and changes in temperature of the wireless communication terminal over time will be described below with reference to FIGS. 11A, 11B, 12A, and 12B. FIGS. 11A and 11B are curves depicting how the temperature of the wireless communication terminal changes over time along with tranmission operation in a case where no temperature control is performed (FIG. 11A) and in a case where the terminal temperature is controlled through transmission power control (FIG. 11B). In the case where the terminal temperature is not controlled as shown in FIG. 11A, after transmission is started from a time t1 at transmission power Pn, the terminal temperature gradually increases, exceeding the guaranteed operating temperature upper time at a time t3, and further continues to increase until the transmission is stopped (time t4). In contrast, in the case where transmission power is controlled as shown in FIG. 11B, a terminal temperature is estimated between time t1 and time t2 to perform the control of decreasing the transmission power from Pn to Pm at the time t2. Thus the terminal temperature is prevented from exceeding the guaranteed operating temperature upper limit before the transmission is stopped (time t4).

FIGS. 12A and 12B are curves depicting how the temperature of the wireless communication terminal changes over time with respect to transmission operation in a case where no temperature control is performed (FIG. 12A) and in a case where the terminal temperature is controlled by controlling transmission power and transmission rate (FIG. 12B). In the case where the terminal temperature is not controlled as shown in FIG. 12A, after transmission is started from a time t1 at transmission power Pn, the terminal temperature gradually increases, exceeding the guaranteed operating temperature upper limit at a time t3, and further continues to increase until the transmission is stopped (time t4). In contrast, in the case where transmission power is controlled as shown in FIG. 12B, a terminal temperature is estimated between t1 and time t2 to perform the control of decreasing the transmission power from Pn to Pm and also decreasing the transmission rate at the time t2. Thus, the terminal temperature is prevented from exceeding the guaranteed operating temperature upper limit before the transmission is stopped (time t5). When the transmission rate is decreased, no request to increase the transmission power is sent from the base station on the communication network. This ensures reliable information communication, though the transmission time is extended.

As described above, if the temperature increases more than expected during transmission, not only is the transmission rate decreased based on the 1xEV-DO standard but also the transmission power is decreased. This prevents the terminal temperature from exceeding the guaranteed operating temperature upper limit. Furthermore, because decreasing the transmission rate is in accordance with the 1xEV-DO standard and no request to increase the transmission power is sent via the communication network in response to an decrease in the transmission power, the temperature of the wireless communication terminal can be prevented from increasing without imposing unwanted load onto the communication network, though transmission takes a longer time than expected as a result.

The wireless communication terminal according to the present invention includes a cellphone device using mobile communication, a personal digital assistant (PDA) having a mobile communication function, a mobile terminal, a communication card connected to a PC for use, etc.

Furthermore, the fact that transmission is being performed at a transmission power value smaller than that specified via the communication network (instead of following the instruction for increasing transmission power sent via the communication network) may be informed not only by displaying a message but also by blinking an LED, emitting sound, generating vibration, etc.

In addition, temperature control may also be performed by recording a program for achieving a function of the main control section 1 in FIGS. 1, 5, and 9 onto a computer readable recording medium and causing a computer system to read the program recorded on this recording medium and execute the program. The "computer system" in this case includes an operating system (OS) and hardware such as a peripheral device. Furthermore, the "computer-readable recording medium" in this case refers to a portable medium such as a flexible disk, a magneto-optical disk, a ROM, and a CD-ROM, as well as a storage device such as a hard disk installed in the computer system. The "computer-readable recording medium" also includes a medium only temporarily retaining a program, such as a volatile memory (RAM) in a computer system functioning as a server or a client where the program is transmitted via a network including the Internet or a communication line including a telephone line.

In addition, the above-described program may be transmitted from the computer system storing this program in a storage device to another computer system via a transmission medium or transmitted waves in the transmission medium. The "transmission medium" for transmitting the program refers to a medium having a function for transmitting information, as typified by a network including the Internet (communication network) and a communication line including a telephone line. Furthermore, the above described program may be a program that achieves only part of the above-described function. In addition, the above described program may be a so-called difference file (difference program) for achieving the above-described function in combination with the program recorded in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal comprising:
   a transmission power control unit that changes transmission power;
   a first storage unit that pre-stores an association of a transmission power value with a difference between a terminal temperature and an ambient temperature;
   a temperature detection unit that detects a temperature of the terminal to obtain a terminal temperature value;
   a transmission power detection unit that detects a current transmission power value;
   a calculation unit that calculates a current ambient temperature value near the terminal; and
   a temperature estimation unit that estimates a terminal temperature value corresponding in an intended transmission power value based on the current ambient temperature value calculated by the calculation unit, the transmission power value to which the transmission power is changed, and the association of the first storage unit, wherein the transmission power control unit controls the transmission power based on the terminal temperature value estimated by the temperature estimation unit.

2. The wireless communication terminal according to claim 1, wherein the calculation unit calculates the current ambient temperature value based on the terminal temperature value detected by the temperature detection unit, the current transmission power value detected by the transmission power detection unit, and the association of the first storage unit.

3. The wireless communication terminal according to claim 1, wherein the transmission power control unit controls the transmission power such that the terminal temperature value estimated by the temperature estimation unit does not exceed a guaranteed operating temperature upper limit of the wireless communication terminal if a transmission power value needs to be changed.

4. The wireless communication terminal according to claim 1, further comprising an ambient temperature convergence estimation that estimates an ambient temperature convergence value based on the terminal temperature value obtained by the temperature detection unit, wherein the transmission power control unit obtains a terminal temperature convergence value from the ambient temperature convergence value estimated by the ambient temperature convergence estimation unit by referring to a value indicating the difference between the terminal temperature and the ambient temperature for each transmission power value stored in the first storage unit during a period of time in which there is no increase in transmission power value, and controls the transmission power such that the terminal temperature convergence value does not exceed a guaranteed operating temperature upper limit of the wireless communication terminal.

5. The wireless communication terminal according to claim 3, further comprising:

a second storage unit that stores a table containing an association of a transmission rate value with each transmission power value; and a transmission rate control unit that control a transmission rate based on a transmission rate value output from the transmission power control unit, wherein the transmission power control unit refers to the second storage unit to obtain a transmission rate value associated with a transmission power value at which the guaranteed operating temperature upper limit of the wireless communication terminal is not exceeded and outputs the obtained transmission rate value to the transmission rate control unit.

6. The wireless communication terminal according to claim 2, further comprising a report unit that reports that transmission is being performed at a transmission power value different from a requested transmission power value, when transmission is performed at a transmission power value different from the requested transmission power value.

* * * * *